United States Patent
Kojima et al.

(10) Patent No.: US 6,849,981 B2
(45) Date of Patent: Feb. 1, 2005

(54) PERMANENT MAGNET TYPE MOTOR AND COMPRESSOR COMPRISING IT

(75) Inventors: Hiroaki Kojima, Kusatsu (JP); Jun Kageyama, Kusatsu (JP); Akio Yamagiwa, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/478,097

(22) PCT Filed: Feb. 27, 2003

(86) PCT No.: PCT/JP03/02281
§ 371 (c)(1),
(2), (4) Date: Nov. 19, 2003

(87) PCT Pub. No.: WO03/079516
PCT Pub. Date: Sep. 25, 2003

(65) Prior Publication Data
US 2004/0145263 A1 Jul. 29, 2004

(30) Foreign Application Priority Data
Mar. 20, 2002 (JP) ........................ 2002-077920

(51) Int. Cl.[7] .............................. H02K 21/12; H01F 1/08
(52) U.S. Cl. .............................. 310/156.43; 310/156.53; 335/296
(58) Field of Search .................... 310/156.53, 156.56, 310/156.57, 156.43; 335/296, 304, 302, 306

(56) References Cited

U.S. PATENT DOCUMENTS

| | | | | |
|---|---|---|---|---|
| 4,110,718 A | * | 8/1978 | Odor et al. | 335/296 |
| 5,929,547 A | * | 7/1999 | Kim | 310/156.53 |
| 6,218,753 B1 | * | 4/2001 | Asano et al. | 310/156.53 |
| 6,486,581 B2 | * | 11/2002 | Miyashita et al. | 310/156.53 |

FOREIGN PATENT DOCUMENTS

| | | |
|---|---|---|
| JP | 5-236686 | 9/1993 |
| JP | 11-355985 | 12/1999 |
| JP | 2000-92763 | 3/2000 |
| JP | 2001-178045 | 6/2001 |

* cited by examiner

Primary Examiner—Tran Nguyen
(74) Attorney, Agent, or Firm—Shinjyu Global IP Counselors, LLP

(57) ABSTRACT

For the purpose of preventing demagnetization of a magnet (32) without any cost increase and improving the max torque and the efficiency of an electric motor (20) by suppressing deterioration of magnetic flux density, a permanent magnet-type electric motor (20) comprises a stator (21) and a rotor (25) disposed in the stator (21), in which a plurality of permanent magnets (32), (32) forming a magnetic pole are inserted in magnet insertion portions (31), (31) of a yoke (26) in such manner that the magnets (32), (32) form in line in the circumferential direction thereof, wherein each magnet (32) is divided into a central magnet (33) that is positioned at the central portion in the width direction of the magnet insertion portion (31) and end magnets (34), (34) that are positioned at end portions of the magnet insertion portion (31), and the end magnets (34), (34) have greater coercive forces than the central magnet (33), whereas the central magnet (33) has a greater magnetic flux density than the end magnets (34), (34). Because the end magnets (34), (34) easy to be demagnetized by the reverse magnetic filed caused by the stator current have greater coercive forces, demagnetization of the magnet (32) can be prevented as a whole. In the meantime, because the central magnet (33) difficult to be demagnetized has a greater magnetic flux density, the max torque and the efficiency of the electric motor (20) can be improved by such great magnetic flux density.

11 Claims, 12 Drawing Sheets

PERMANENT MAGNET TYPE MOTOR AND COMPRESSOR COMPRISING IT

TECHNICAL FIELD

The present invention belongs to a technical field of a permanent magnet-type electric motor and a compressor using the same.

BACKGROUND ART

Conventionally, a compressor, which comprises a compressing mechanism for compressing an operating gas in a casing and an electric motor for being coupled with and driving the compressing mechanism, has been well known in general, and, for example, such compressor has been used for a refrigeration cycle, such as an air conditioner and the like. As an example or an electric motor for this kind of compressor, a permanent magnet-type electric motor, which comprises a stator for generating rotating magnetic field by turning on electricity to coils of stator yoke (core) made from magnetic material and a rotor which is disposed in the stator so as to rotate therein and in which a plurality of permanent-magnets forming a magnetic pole are inserted in magnet insertion portions of a rotor yoke (core) in such manner that the magnets form in line in the circumferential direction thereof, has been used.

As a permanent magnet-type electric motor like the above, it has been conventionally proposed, as shown in Japanese Laid-Open Patent Publication No. 2000-92763, that each magnet includes portions that have different magnetic forces in the width direction thereof (in the circumferential direction of yoke), wherein end portions of the magnet have smaller magnetic forces than a central portion of the magnet in order to prevent deterioration of magnetic flux density due to leakage flux between the permanent magnets. According to this structure, the leakage flux that may leak out by way of the yoke between adjacent magnets can be made small, and a distribution of magnetic flux in air gap between the rotor and the stator can be changed to be similar to substantially sine waves, resulting in improvement of high efficiency and high torque of the electric motor.

In the meantime, such rotor having permanent magnets inserted in the insertion portions of yoke has problems that the rotor may be heated under a high temperature condition where the electric motor operates and, if reverse magnetic field is caused by stator current to produce a desired torque of electric motor, each magnet may be demagnetized by these heating and reverse magnetic field.

In order to prevent this demagnetization of magnet, a magnet having large intrinsic coercive force (force of retaining magnetism) or a large thickness in the magnetic field direction may be applied. In this case, however, such magnet having large intrinsic coercive force tends to have smaller magnetic flux density, and deterioration of the max torque and the efficiency of electric motor is inevitable due to this small magnetic flux density.

On the other hand, in the event that a magnet with a large thickness in the magnetic field direction is used, much magnetic material is necessary for the increase of thickness, resulting in an increase in cost.

The present invention has been made in view of the above-described problems, and an object of the present invention is to prevent demagnetization of magnets as a whole without any cost increase and improve the max torque and the efficiency of electric motor by suppressing deterioration of magnetic flux density, by making improvements on a characteristic of each magnet inserted in the rotor yoke.

DISCLOSURE OF THE INVENTION

In order to achieve the above-described object, paying attention to the situation where each magnet inserted in a rotor yoke is not demagnetized as a whole by the reverse magnetic field, but there exists a particular portion that is easy to be demagnetized, the present invention is constituted such that each magnet includes portions that have different magnitudes of intrinsic coercive force and magnetic flux density respectively, and a portion easy to be demagnetized has a greater intrinsic coercive force, whereas a portion difficult to be demagnetized has a greater magnetic flux density.

Specifically, according to the first aspect of the present invention, a permanent magnet-type electric motor comprises a stator (21), and a rotor (25) disposed in the stator (21), in which a plurality of permanent magnets (32), (32) forming a magnetic pole are inserted in magnet insertion portions (31), (31) of a yoke (26) in such manner that the magnets (32), (32) form in line in the circumferential direction thereof, wherein each of the magnet (32) is constituted of a plurality of magnets (33), (34) that are divided in the circumferential direction of yoke, and a magnet of the divided magnets that is positioned where it is easy to be demagnetized has a greater intrinsic coercive force (force of retaining magnetism) than a magnet of the divided magnets that is positioned where it is difficult to be demagnetized, whereas the magnet difficult to be demagnetized has a greater magnetic flux density than the magnet easy to be demagnetized.

According to the above-described structure, each of the magnet (32) of the rotor (25) is constituted of a plurality of magnets (33), (34) that are divided in the circumferential direction of yoke, and the magnet positioned where it is easy to be demagnetized has a greater intrinsic coercive force than the magnet positioned where it is difficult to be demagnetized. Thus, the magnet positioned where it is easy to be demagnetized, for example, by the reverse magnetic field due to stator current becomes difficult to be demagnetized, and thereby demagnetization of magnet (32) can be prevented as a whole. In the meantime, because the magnet difficult to be demagnetized has a greater magnetic flux density than the magnet easy to be demagnetized, this great magnetic flux density can maintain the magnetic flux density of the whole magnet (32) at greater value, and thereby the max torque and the efficiency of electric motor can be improved. According to these functions, demagnetization of the magnet (32) can be prevented without any cost increase by decreasing the amount of material used for the magnet (32) without increasing thickness in the magnetic field direction, and the max torque and the efficiency of electric motor can be improved by suppressing deterioration of the magnetic flux density.

Further, according to the second aspect of the present invention, each of above-described magnet (32) is divided into a central magnet (33) that is positioned at the central portion in the width direction of the magnet insertion portion (31) and end magnets (34), (34) that are positioned at end portions of the magnet insertion portion (31), and the central magnet (33) has a greater intrinsic coercive force than the end magnets (34), (34), whereas the end magnets (34), (34) have greater magnetic flux density than that of the central magnet (33).

In the rotor (25) in which each magnet (32) is positioned close to the outer peripheral surface of the yoke (26), the central portion in the width direction of the magnet (32) is easier to be demagnetized than the end portions. In this case, this demagnetization can be prevented by the structure of the second aspect of the present invention that the magnet (32) is divided into the central magnet (33) that is positioned at the central portion in the width direction of the magnet insertion portion (31) and the end magnets (34), (34) that are positioned at end portions of the magnet insertion portion (31), and the central magnet (33) has a greater intrinsic coercive force than the end magnets (34), (34). Because the end magnets (34), (34) that are difficult to be demagnetized have greater magnetic flux density than the central magnet (33), this magnetic flux density of the end magnets (34), (34) can improve the max torque and the efficiency of electric motor.

In the meantime, according to the third aspect of the present invention, contrary to the above, each of the magnet (32) is divided into a central magnet (33) that is positioned at the central portion in the width direction of the magnet insertion portion (31) and end magnets (34), (34) that are positioned at end portions of the magnet insertion portion (31), and the central magnet (33) has a greater magnetic flux density than the end magnets (34), (34), whereas the end magnets (34), (34) have greater intrinsic coercive forces than the central magnet (33).

Namely, in the rotor (25) in which each magnet (32) is positioned far from the outer peripheral surface of the yoke (26), the end portions in the width direction of the magnet (32) are easier to be demagnetized than the central portion. In this case, this demagnetization can be prevented by the structure of the third aspect of the present invention that the end magnets (34), (34) positioned at end portions in the width direction of the magnet insertion portion (31) have greater intrinsic coercive forces than the central magnet (33). Further, because the central magnet (33) that is easy to be demagnetized has a greater magnetic flux density than the end magnets (34), (34), the magnetic flux density of the central magnet (33) can improve the max torque and the efficiency of electric motor.

According to the fourth aspect of the present invention, the magnet insertion portion (31) comprises a central insertion portion (31a) that is positioned at the central portion in the circumferential direction of the yoke (26) and magnetic flux barrier portions (31b), (31b) that extend outwardly and subsequently in substantially the radial direction of the yoke (26) from the both ends of the central insertion portion (31a), and the central magnet (33) and the end magnets (34), (34) are inserted only in the central insertion portion (31a). According to this structure, the same function and effects as the above can be achieved.

Further, similarly, according to the fifth aspect of the present invention, the magnet insertion portion (31) comprises a central insertion portion (31a) that is positioned at the central portion in the circumferential direction of the yoke (26) and magnetic flux barrier portions (31b), (31b) that extend outwardly and subsequently in substantially the radial direction of the yoke (26) from the both ends of the central insertion portion (31a), and the central magnet (33) is inserted in the central insertion portion (31a) and the end magnets (34), (34) are inserted in the magnetic flux barrier portions (31b), (31b), respectively.

Thus, the same function and effects as the case where the central magnet (33) has a greater magnetic flux density than the end magnets (34), (34), whereas the end magnets (34), (34) have greater intrinsic coercive forces than the central magnet (33), can be achieved. Also, the magnetic flux of the magnet (32) in the rotor (25) becomes great, and the magnet torque caused by a reaction force between this great magnetic flux and the magnetic flux of the stator (21), namely motor torque of the electric motor (20), can be increased.

Further, according to the six aspect of the present invention, a permanent magnet-type electric motor comprises a stator (21) and a rotor (25) disposed in the stator (21), in which a plurality of permanent magnets (32), (32) forming a magnetic pole are inserted in magnet insertions (31), (31) of a yoke (26) in such manner that the magnets (32), (32) form in line in the circumferential direction thereof, wherein each of the magnet (32) includes portions that have different magnetic flux and intrinsic coercive force thereof in the circumferential direction of yoke, and a portion of the magnet (32) that is positioned where it is easy to be demagnetized has a greater intrinsic coercive force than a portion of the magnet (32) that is positioned where it is difficult to be demagnetized, whereas the portion difficult to be demagnetized has a greater magnetic flux density than the portion easy to be demagnetized.

According to the above-described structure, each of the magnet (32) inserted in the stator (25) includes portions that have different magnetic flux and intrinsic coercive force thereof in the circumferential direction of yoke, and the portion easy to be demagnetized has a greater intrinsic coercive force than the portion difficult to be demagnetized. Thus, the magnet portion that is easy to be demagnetized due to the reverse magnetic field by stator current or the like becomes difficult to be demagnetized, and thereby demagnetization of the magnet (32) can be prevented. In the meantime, because the magnetic flux density of the magnet portion that is difficult to be demagnetized is greater than that of the portion that is easy to be demagnetized, the max torque and the efficiency of electric motor can be improved by this great magnetic flux density. Accordingly, the present aspect of the invention can also achieve the same function and effect as the above-described aspect of the invention.

According to the seventh aspect of the present invention, in the above-described permanent magnet-type electric motor, each of the magnet (32) includes a magnet central portion (32a) that is positioned at the central portion in the width direction of the magnet insertion portion (31) and magnet end portions (32b), (32b) that are positioned at end portions of the magnet insertion portion (31), respective magnetic flux and intrinsic coercive force of which are different from each other, and the magnet central portion (32a) has a greater intrinsic coercive force than the magnet end portions (32b), (32b), whereas the magnet end portions (32b), (32b) have greater magnetic flux density than the magnet central portion (32a). In this case, the same function and effect as the above can be achieved as well.

According to the eighth aspect of the present invention, in the above-described permanent magnet-type electric motor, each of the magnet (32) includes a magnet central portion (32a) that is positioned at the central portion in the width direction of the magnet insertion portion (31) and magnet end portions (32b), (32b) that are positioned at end portions of the magnet insertion portion (31), respective magnetic flux and intrinsic coercive force of which are different from each other, and the magnet central portion (32a) has a greater magnetic flux density than the magnet end portions (32b), (32b), whereas the magnet end portions (32b), (32b) have greater intrinsic coercive forces than the magnet central portion (32a). In this case, the same function and effect as the above can be achieved as well.

According to the ninth aspect of the present invention, similarly to the above, the magnet insertion portion (31)

comprises a central insertion portion (31a) that is positioned at the central portion in the circumferential direction of the yoke (26) and magnetic flux barrier portions (31b), (31b) that extend outwardly and subsequently in substantially the radial direction of the yoke (26) from the both ends of the central insertion portion (31a), and the magnet (32) is inserted only in the central insertion portion (31a). According to this structure, the same function and effects as the above can be achieved.

In the meantime, according to the tenth aspect of the present invention, similarly to the above, the magnet insertion portion (31) comprises a central insertion portion (31a) that is positioned at the central portion in the circumferential direction of the yoke (26) and magnetic flux barrier portions (31b), (31b) that extend outwardly and subsequently in substantially the radial direction of the yoke (26) from the both ends of the central insertion portion (31a), and the magnet (32) is inserted in the magnet insertion portion (31) in such manner that the magnet central portion (32a) is inserted in the central insertion portion (31a) and the magnet end portions (32b), (32b) are inserted in the magnetic flux barrier portions (31b), (31b), respectively.

Thus, the same function and effects as the case where the magnet central portion (32a) has a greater magnetic flux density than the magnet end portions (32b), (32b), whereas the magnet end portions (32b), (32b) have greater intrinsic coercive forces than the magnet central portion (32a) can be achieved. Also, similarly to the above, the magnetic flux of the magnet (32) in the rotor (25) becomes great, and the magnet torque caused by a reaction force between this great magnetic flux and the magnetic flux of the stator (21), namely motor torque of the electric motor (20), can be increased.

Further, according to the eleventh aspect of the present invention, a compressor is constituted such that it comprises a casing (1) and a compressing mechanism (3), wherein the permanent magnet-type electric motor described above is installed in the casing (1) to be coupled to the compressing mechanism (3). Thus, an optimum compressor that achieves the above-described effects of the present invention can be obtained.

BEST MODE FOR CARRING OUT THE INVENTION

A best mode for carrying out the present invention will be described as embodiments with reference to drawings.
Embodiment 1

Figure 4:
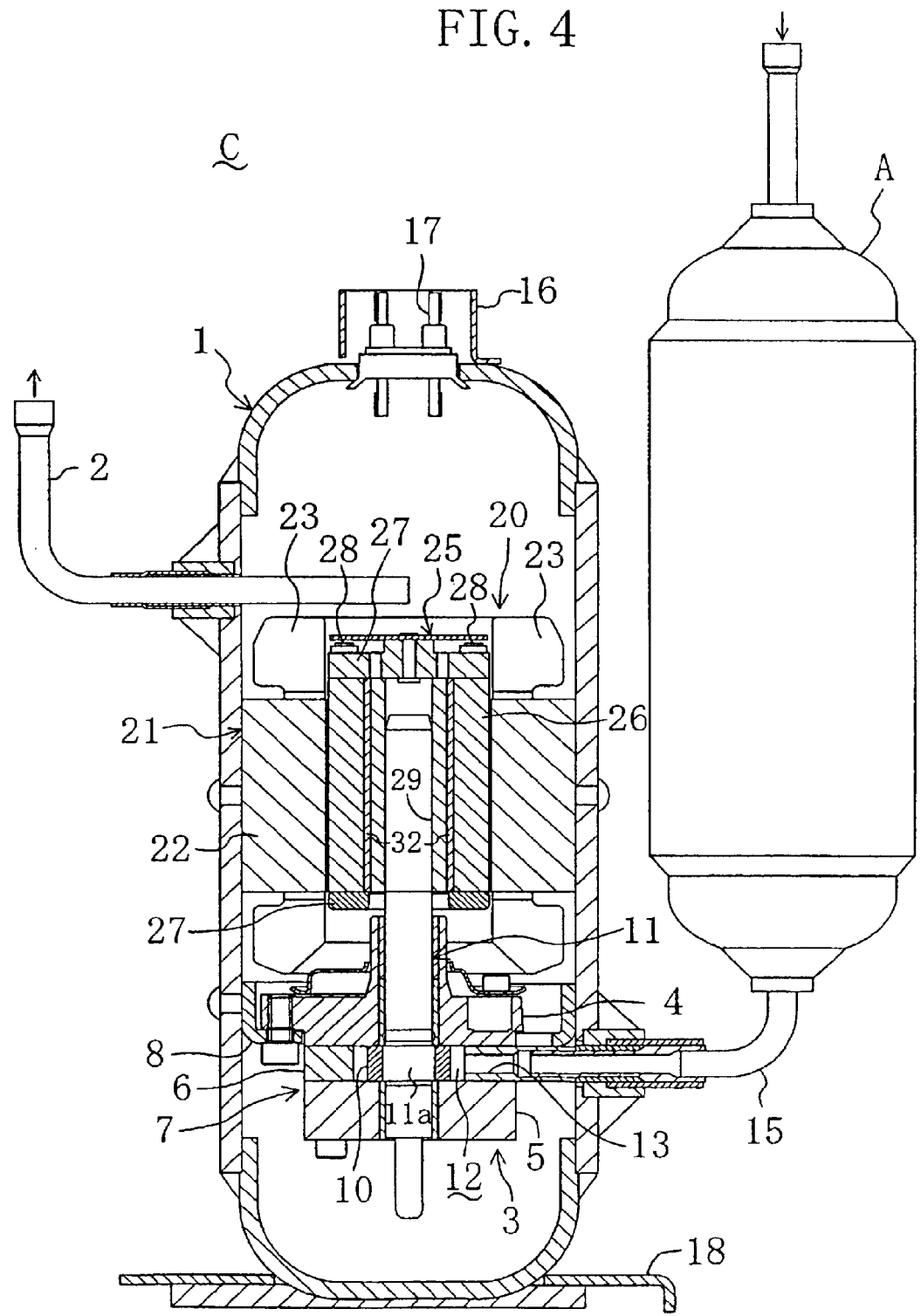
FIG. 4 is an enlarged sectional view of a compressor.

FIG. 4 shows a dome-type compressor (C) equipped with a permanent magnet-type electric motor according to the fast embodiment of the present invention. A reference numeral (1) denotes a sealed-cylindrical casing (dome) extending in the perpendicular direction. A coolant discharge pipe (2) is attached to the upper portion of the sidewall of the casing (1), being inserted therein airtightly, connecting between the inside and the outside of the casing (1), and positioning an inner end portion thereof at around the central of the upper end of the casing (1).

A compressing mechanism (3) that discharges a coolant gas, which has been took in and then compressed, into the casing (1) is placed in the bottom of the casing (1). The compressing mechanism (3) includes a cylinder (7) comprising two front and rear heads (4), (5) that are disposed in the perpendicular direction and one ring-shape cylinder body (6) interposed airtightly between the front and rear heads (4), (5). The cylinder (7) is fixed to the sidewall of the casing (1) through a mounting plate (8). A swing piston (10) (swing) made of a ring-shape roller is disposed in the cylinder body (6) in such manner that it is positioned between the front and rear heads (4), (5).

A crankshaft (11) extending in the perpendicular direction penetrates airtightly the central portion of the front and rear beads (4), (5). The crankshaft (11) includes an eccentric portion (11a), and the eccentric portion (11a) is inserted in a central hole of the swing piston (10) for its rotatable supporting. The swing piston (10) swings around the crankshaft (11) by the rotation of the crankshaft (11), sealing a space between the outer peripheral portion of the swing piston (10) and the inner peripheral portion of the cylinder (6) by lubricating oil.

That is, a recessed groove portion extending in the perpendicular direction is provided at a certain portion on the inner peripheral surface of the cylinder body (6), and a cylindrical swing shaft including a blade inserting portion that is cut out in the diameter direction is supported swingably at the recessed groove portion with its shaft center extending in the perpendicular direction, which are not shown in any drawing. In the meantime, the swing piston (10) includes a plate-shape blade projection integrated thereto and extending in the perpendicular direction at its outer peripheral surface. The end portion of this blade is inserted in the blade inserting portion of the swing shaft at the recessed grove portion of the inner peripheral surface of the cylinder body (6) in such manner that it can slide in the blade inserting portion. An arc-shape space enclosed by the outer peripheral surface of the swing piston (10), the inner peripheral surface of the cylinder body (6) and the front and rear heads (4), (5) which are disposed at the both sides is compartmented by the blade to form an operating chamber (12) (compression chamber).

A suction hole (13) and a discharge hole (not shown in any drawing) open at places of the cylinder body (6) which are opposite sides of the above-described recessed groove portion (blade position). The suction hole (13) is coupled to the downstream end portion of a coolant suction pipe (15) penetrating the sidewall of the casing (1), and the upstream end portion of each of the coolant suction pipe (15) is coupled to an accumulator (A). In the meantime, the discharge hole opens at the inside of the casing (1), and a discharge valve (not shown in any drawing) as a check valve made of a lead valve is provided in the discharge hole. By the swing of the swing piston (10) caused by the rotation of the crankshaft (11), the low-pressure coolant gas in the accumulator (A) is sucked into the operating chamber (12) through the coolant suction pipe (15) and the suction hole (13). The coolant gas is compressed by volume reduction of the operating chamber (12) caused by the swing of the swing piston (10), and then discharged into the casing (1) from the discharge hole thorough the discharge valve. Thus, the pressure in the cylinder (1) is increased and then the high-pressure coolant gas is discharged out of the casing (1) through the coolant discharge pipe (2).

Herein, the outer peripheral surface of the eccentric portion (11a) of the crankshaft (11) and certain portions of the outer peripheral surface of the crankshaft (11), which are located at the upper and lower sides of the eccentric portion (11a), are provided with discharge holes of lubricating oil opened, respectively, which are not shown in any drawing. Each of these discharge holes of lubricating oil is connected to a passage of lubricating oil passing through the center axis portion of the crankshaft (11), and the lower end portion of the passage of lubricating oil opens at the lower end surface of the crankshaft (II). The lubricating oil collected in the bottom of the casing (1) is sucked into the passage of lubricating oil by means of centrifugal force by the rotation of the crankshaft (11), and then supplied to sliding portions of the compressing mechanism (3) from the discharge holes of lubricating oil. A part of the lubricating oil supplied is mixed with the coolant gas discharged from the discharge hole of the compressing mechanism (3) into the casing (1) and then discharged.

A permanent magnet-type electric motor (20) is disposed at substantially the central portion in the perpendicular direction of the cylinder (1) such that it has its rotational axis extending in the perpendicular direction and is adjacent to the upper side of the compressing mechanism (3). The electric motor (20) is coupled to the compressing mechanism (3) through the crankshaft (11) and drives the mechanism (3). The electric motor (70) includes a stator (21) and a rotor (25) that is disposed so as to rotate within the inside of the stator (21). The stator (21) includes a cylindrical stator yoke (22) (stator yoke), in which ring-shape thin plates made of many magnetic steel plates are laminated in the axis direction (the perpendicular direction of the casing (1)) and integrated thereto together, and coil insertion portions (not shown in any drawing) comprising a plurality of recessed grooves extending in the axis direction formed on the inner peripheral surface thereof are provided at equal intervals in the peripheral direction. Further, the stator (21) includes, for example, three-phase stator coils (23), (23) that are inserted in the above coil insertion portions and coiled at the stator yoke (22). The outer peripheral surface of the stator yoke (22) is fixed to the sidewall of the casing (1) by spot welding. Supplying electric power to input terminals of the three-phase stator coils (23), (23) makes the stator yoke (22) produce rotating magnetic field.

Figure 1:
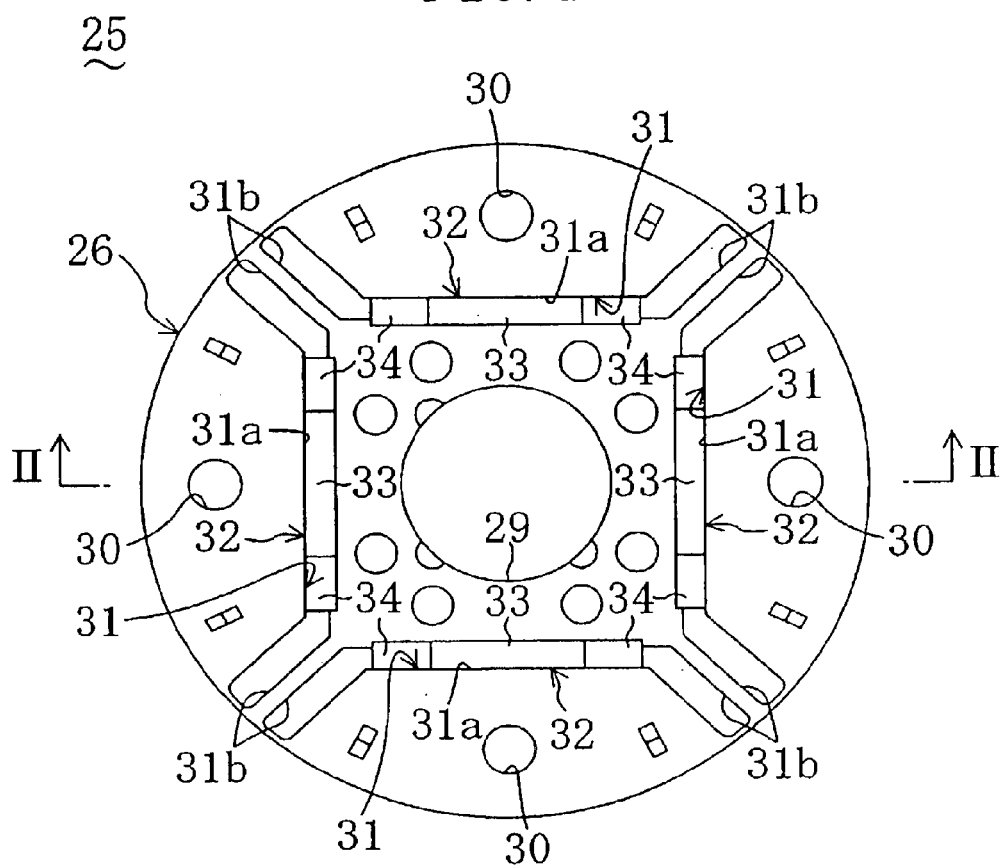
FIG. 1 is a plan view showing a rotor yoke of a permanent magnet-type electric motor according to the first embodiment of the present invention.
Figure 1A:
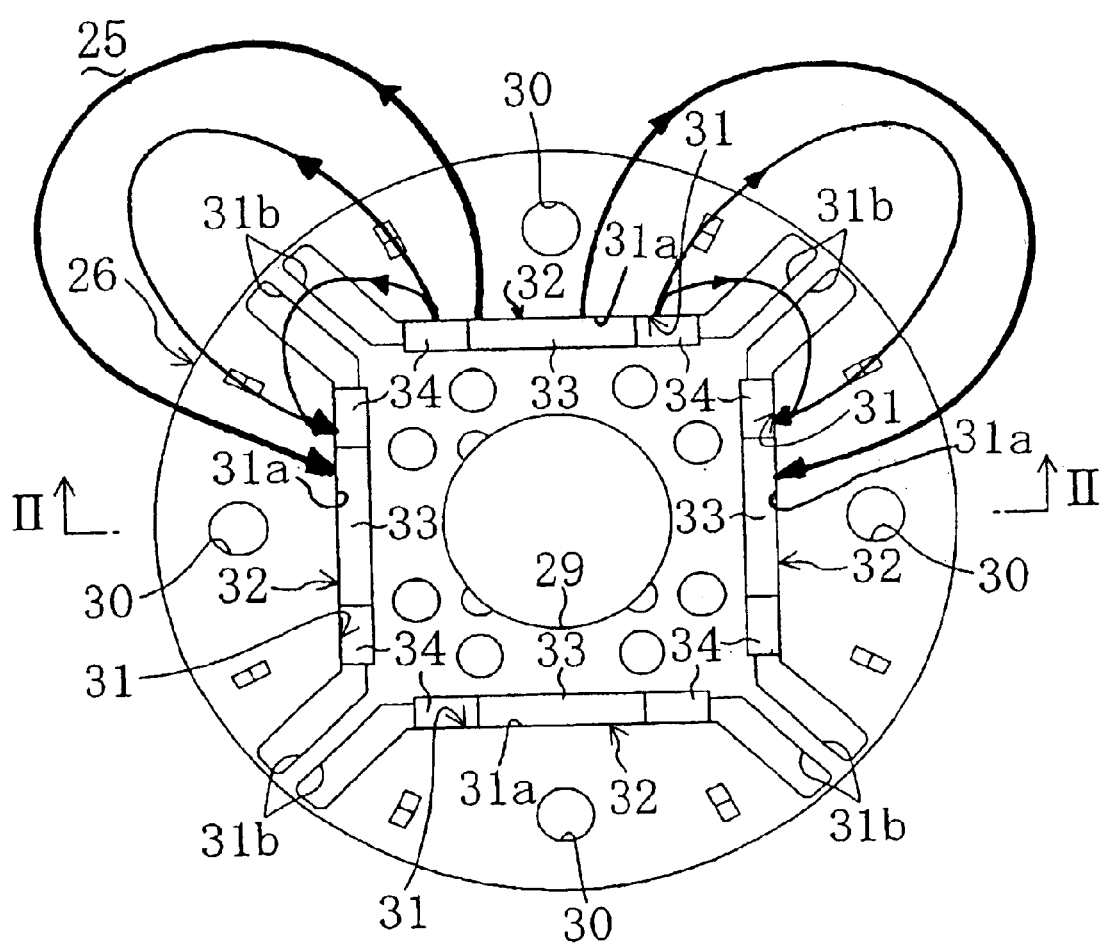
FIG. 1A is a view according to FIG. 1 illustrating the inherent flow of the rotor magnetic flux.
Figure 1B:
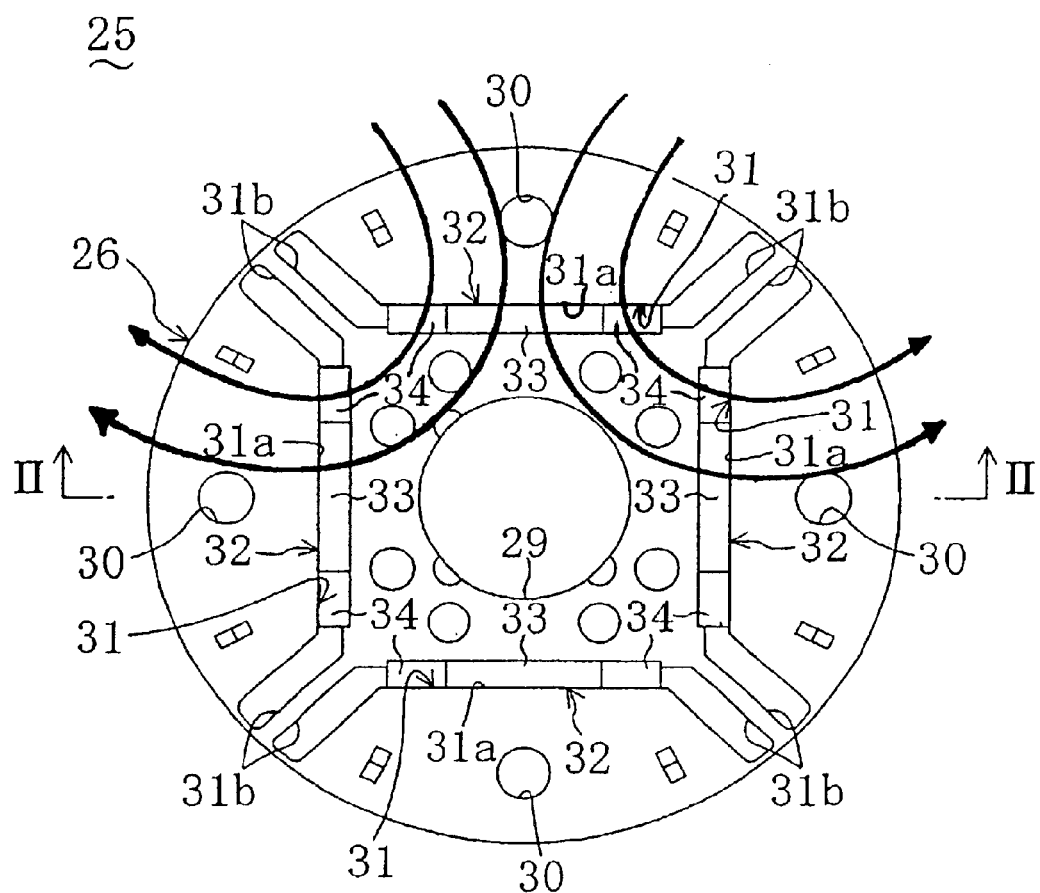
FIG. 1B is a view according to FIG. 1 illustrating the inherent flow of the stator magnetic flux.
Figure 2:
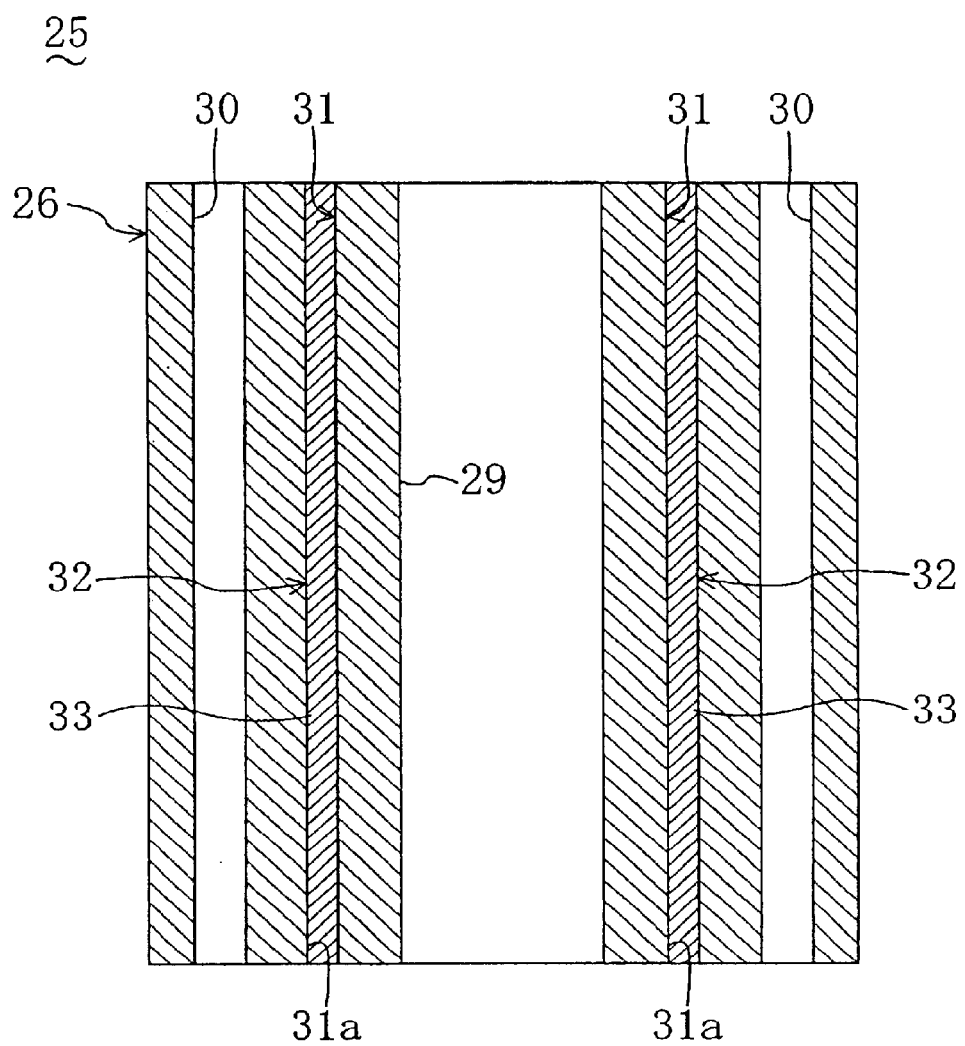
FIG. 2 is a sectional view taken on line II—II of FIG. 1.

In the meantime, the rotor (25), as shown in FIGS. 1 and 2, includes a cylindrical rotor yoke (26) (rotor core), in which circular thin plates made of many magnetic steel plates as magnetic materials are laminated in the axis direction and integrated thereto together by caulking, and end plates (27), (27) disposed at the both sides of the rotor yoke (26). The rotor yoke (26) and the end plates (27), (27) are coupled to be integrated to one another by a plurality of coupling rivets (28), (28) that penetrate them in the axis direction. The rotor (25) is provided with an axis insertion hole (29) at its central portion, and the upper end portion of the crankshaft (11) is inserted into the axis insertion hole (29) to be connected thereto by shrinkage fitting so that the rotor (25) can drive the swing piston (10) of the compressing mechanism (3) through the crankshaft (11).

At the peripheral portion of the rotor yoke (26), four magnet insertion portions (31), (31) . . . penetrating the stator (25) in the axis direction are formed around the axis insertion hole (29). A permanent magnet (32) that is made of a rare-earth magnet and has a rectangular shape is inserted in and fixed to each of the magnet insertion portions (31). The stator (25) is formed as a type of magnet insertion. Specifically, each magnet insertion portion (31) includes a central insertion portion (31a) positioned at the central portion in the peripheral direction of the rotor yoke (26) and a pair of magnet flux barrier portions (31b), (31b) extending subsequently from the both ends of the central insertion portion (31a). The central insertion portion (31a) and each magnetic flux barrier portion (31b) are formed such that they have respectively shapes of rectangular cross section (slit-shape). The central insertion portions (31a), (31a) of the four magnet insertion portions (31), (31) . . . are disposed around the axis insertion hole (29) in such manner that they constitute four respective sides of substantially a square, and the permanent magnet (32) is inserted in and fixed to each of the central insertion (31a). In the meantime, each magnetic flux barrier portion (31b) extends outwardly and subsequently in substantially the radial direction of the rotor yoke (26) from the both ends of the central insertion portion (31a), substantially in parallel with the magnetic flux barrier portion (31b) of the magnet insertion portion (31) next thereto.

Herein, the position of the central insertion portion (31a) of the magnet insertion portion (31), namely, the position of the magnet (32) inserted therein, is set at a certain place which is substantially at around the middle position between the central and the outer peripheral surface of the rotor yoke (26) and relatively farther from the outer peripheral surface of the yoke (26). The function of the flux caused by the magnets (32), (32) constituting four poles and the flux caused by four magnetic poles formed by the stator coils (23), (23) can rotate the rotor (25) to drive the compressing mechanism (3).

Further, the magnetic flux barrier portion (31b) of the magnet insertion portion (31) is formed as air gap (space) without any magnet (32), so that it can decrease a leakage of magnetic flux and provide a passage of coolant gas.

In the drawings, a reference numeral (30) denotes an insertion hole for the coupling rivet (28), and a reference numeral (16) denotes a electric-power connecting portion attached to the outer surface of the upper wall of the casing (1), to which a plurality of terminals (17), (17) are attached. These terminals (17), (17) are coupled to ends of the stator coils (23), (23) . . . of the electric motor (20). Also, a reference numeral (18) denotes a supporting bracket for supporting the compressor, which is fixed and integrated to the lower portion of the casing (1).

Figure 3:
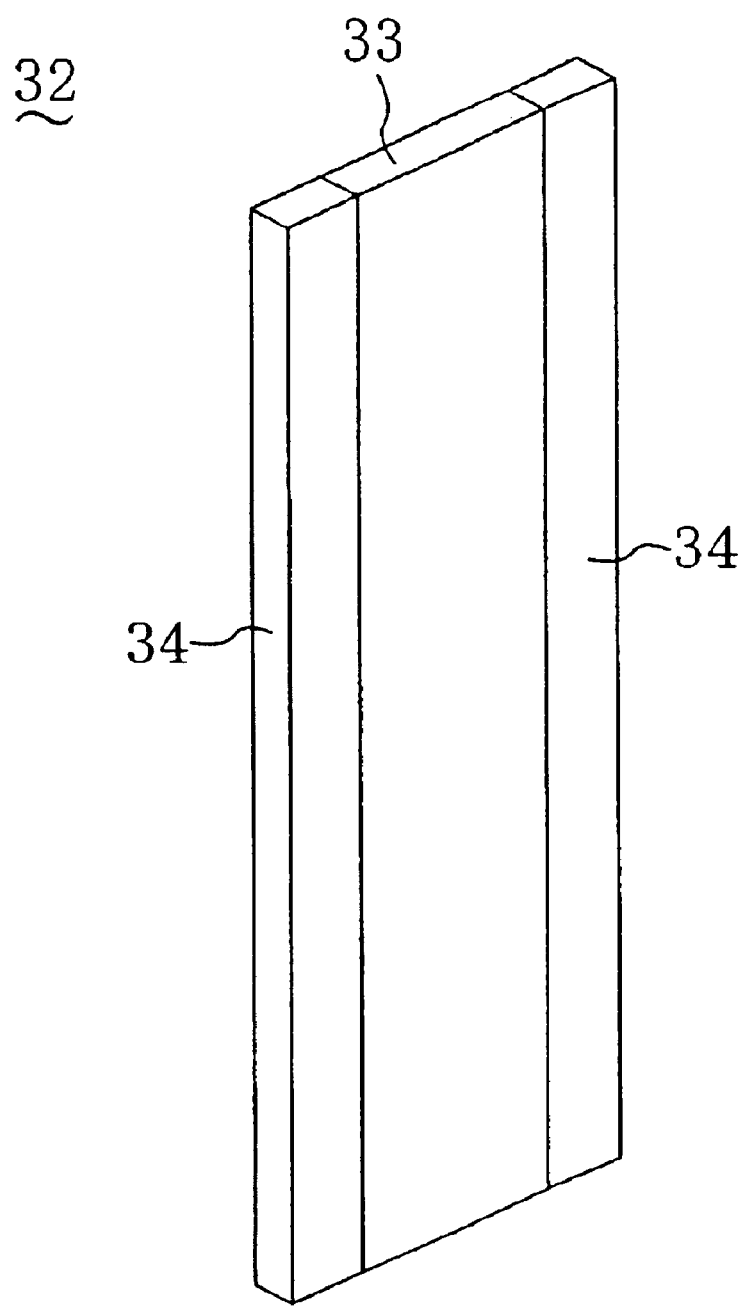
FIG. 3 is an enlarged perspective view of a magnet.

As a feature of the present invention, each magnet (32) that is inserted in and fixed to only the central insertion portion (31a) of each magnet insertion portion (31), as shown in FIGS. 1 and 3, is divided into three parts in the peripheral direction of the yoke, namely in the width direction of the central insertion portion (31a) in the magnet insertion portion (31). That is, each magnet (32) is constituted of one plate-shape central magnet (33), which is positioned at the central portion in the width direction of the central insertion portion (31a) of the magnet insertion portion (31), and two end magnets (34), (34) having similar shapes, which are positioned at end portions of the central insertion portion (31a) of the magnet insertion portion (31).

Herein, the position of the central insertion portion (31a) of each of the magnet insertion portion (31), thereby the position of each magnet (32) therein is far from the outer peripheral surface of the rotor yoke (26). (See the third embodiment shown in FIG. 6 for comparison, which will be described below) This structure provides characteristics that the both ends of the one-piece (not-divided) magnet positioned in the central insertion portion (31a) of the magnet insertion portion (31) is easy to be demagnetized, while the central portion thereof is difficult to be demagnetized, due to the reverse magnetic field (stator magnetic flux) caused by the stator current flowing through each coil (23) of the stator (21). Accordingly, in the present invention, two end magnets (34), (34) that are positioned where it is easy to be demagnetized due to the reverse magnetic field caused by the stator current have greater intrinsic coercive forces (forces of retaining magnetism) than the central magnet (33) that is positioned where it is difficult to be demagnetized, whereas the magnet (33) difficult to be demagnetized has a greater magnetic flux density than the magnets (34), (34) easy to be demagnetized.

Accordingly, in the present embodiment, when the rotor (25) rotates by the electric motor (20) during operation of the compressor (C) and thereby the swing piston (10) of the compressing mechanism (3) coupled to the rotor (25) by the crankshaft (11) swings, the lower-pressure coolant gas in the accumulator (A) is sucked into the operating chamber (12) through the coolant suction pipe (15) and the suction hole (13) by the swing operation of the swing piston (10). Then, the coolant gas is compressed by the volume reduction of the operating chamber (12) by operation of the swing piston (10), and discharged into the casing (1) from the discharge hole through the discharge valve, resulting in a pressure increase in the casing (1). The high-pressure coolant gas in the casing (1) is discharged out of the casing (1) through the coolant discharge pipe (2).

Herein, in the rotor (25) of the electric motor (20), each magnet (32) inserted in the central insertion portion (31a) of the magnet insertion portion (31) of the yoke (26) is positioned relatively farther from the outer peripheral surface of the yoke (26). Accordingly, because the both ends of the magnet (32) are easier to be demagnetized due to the reverse magnetic field caused by the current of the stator (21) of the electric motor (20) than the central portion, the both ends of the magnet are going to be demagnetized. However, each magnet (32) is divided into three parts, one central magnet (33) and two end magnets (34), (34), and two end magnets (34), (34) that are positioned where it is easy to be demagnetized have greater intrinsic coercive forces than the central magnet (33) that is positioned where it is difficult to be demagnetized. Thus, the end magnets (34), (34) become difficult to be demagnetized regardless of the reverse magnetic field by the stator current. Accordingly, demagnetization of the entire magnet (32) can be prevented without increasing a thickness of the magnet (32) in the direction of magnetic field.

In the meantime, the magnet (33) that is positioned where it is difficult to be demagnetized has a greater magnetic flux density than the magnets (34), (34) that are positioned where it is easy to be demagnetized. Accordingly, the magnetic flux density of the magnet (32) can be maintained great as a whole by this central magnet (33) having great magnetic flux density, and thereby the max torque and the efficiency of the electric motor (20) can be improved.

That is, as described above, the both functions of demagnetization prevention, by the end magnets (34), (34) and maintenance of great magnetic flux density by the central magnet (33) can prevent demagnetization of the magnet (32) without any cost increase by decreasing the amount of materials used for each magnet (32) and improve the max torque and the efficiency of electric motor (20) by suppressing deterioration of magnetic flux density.

Embodiment 2

Figure 5:
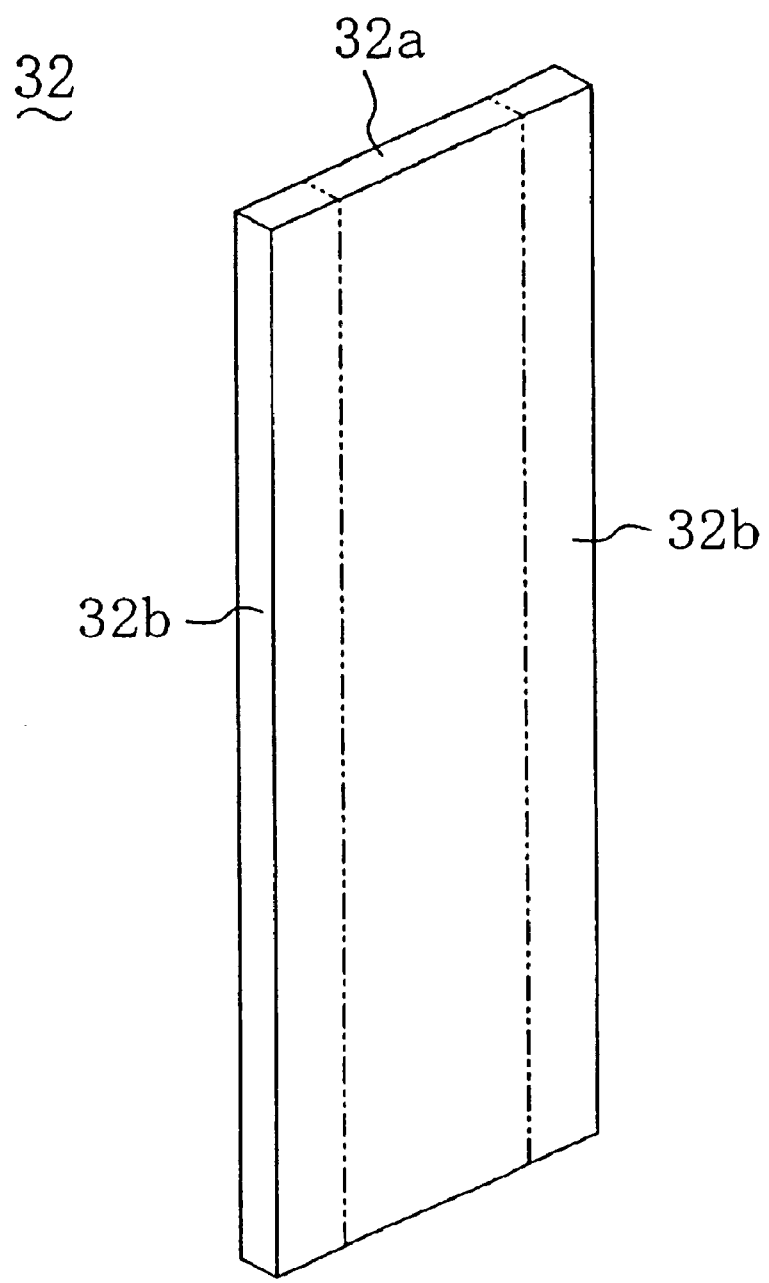
FIG. 5 is a view equivalent to FIG. 3 according to the second embodiment of the present invention.

FIG. 5 shows the second embodiment of the present invention (hereinafter, the same components as those shown in FIGS. 1 to 4 are denoted by the same reference numerals, whose description will be omitted). In the first embodiment described above, each magnet (32) is divided into three parts, the central magnet (33) positioned in the central portion in the width direction of the central insertion portion (31a) of the magnet insertion portion (31) and the end magnets (34), (34) positioned at the end portions in the width direction of the central insertion portion (31a) of the magnet insertion portion (31), and the end magnets (34), (34) have greater intrinsic coercive forces than the central magnet (33), whereas the central magnet (33) has a greater magnetic flux density than the end magnets (34), (34). However, in the second embodiment, it is constituted such that one magnet (32) includes portions that have different magnetic flux and intrinsic coercive force thereof in the width direction.

That is, in the present embodiment, as shown in FIG. 5, each magnet (32) is not divided like the first embodiment, but consists of one magnet plate, and its magnetic flux density and intrinsic coercive force are different along the peripheral direction (the width direction) of the yoke (26). Specifically, each of the magnet (32) includes one magnet central portion (32a) that is positioned at the central portion in the width direction of the central insertion portion (31a) of the magnet insertion portion (31) and magnet end portions (32b), (32b) that are positioned at end portions of the central insertion portion (31a), respective magnetic flux and intrinsic coercive force of which are different from each other, and the magnet (32) has changing characteristics in such manner that the magnet central portion (32a) that is positioned where it is difficult to be demagnetized has a greater intrinsic coercive force than the magnet end portions (32b), (32b) that are positioned where it is easy to be demagnetized, whereas the magnet end portions (32b), (32b) easy to be demagnetized have greater magnetic flux density than the magnet central portion (32a) difficult to be demagnetized.

Other components of the present embodiment are the same as the first embodiment. Accordingly, the present embodiment using the magnet (32) consisting of one plate can also provide the same function and effects as the first embodiment.

Embodiment 3

Figure 6:
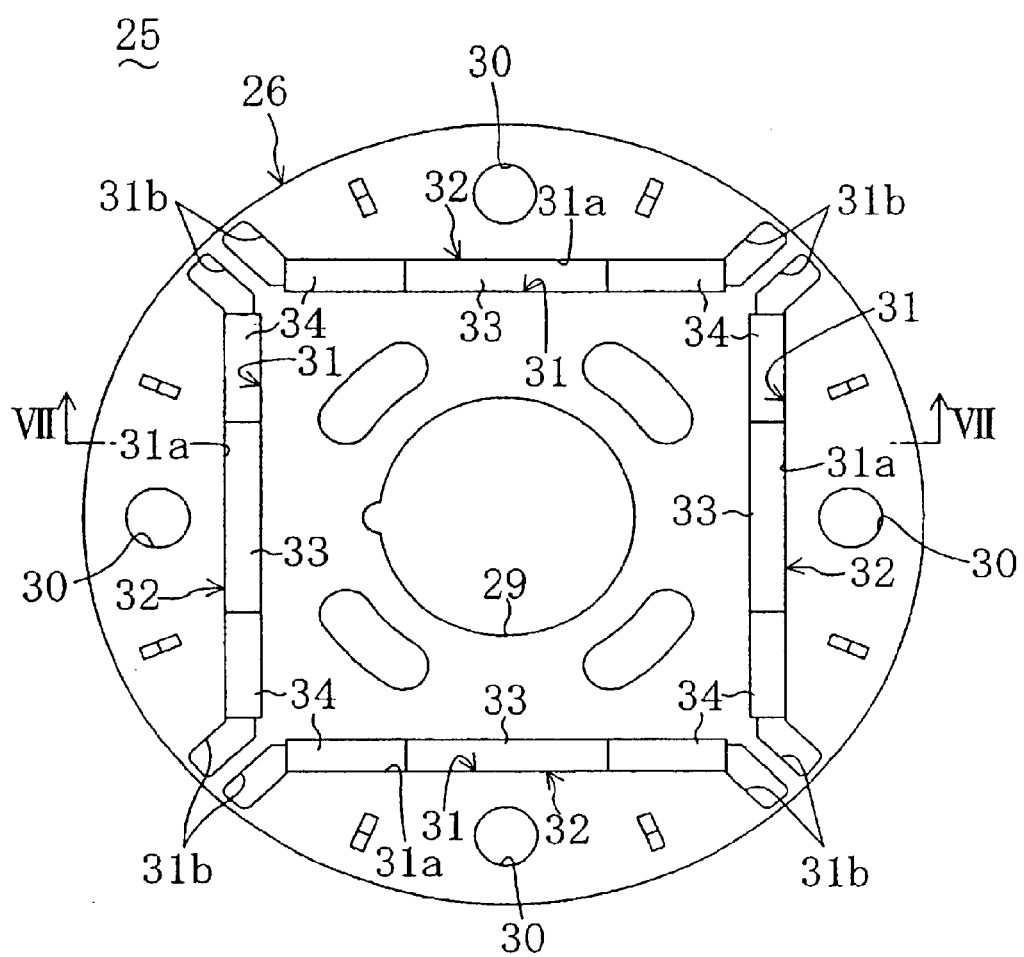
FIG. 6 is a view equivalent to FIG. 1 according to the third embodiment of the present invention.
Figure 6A:
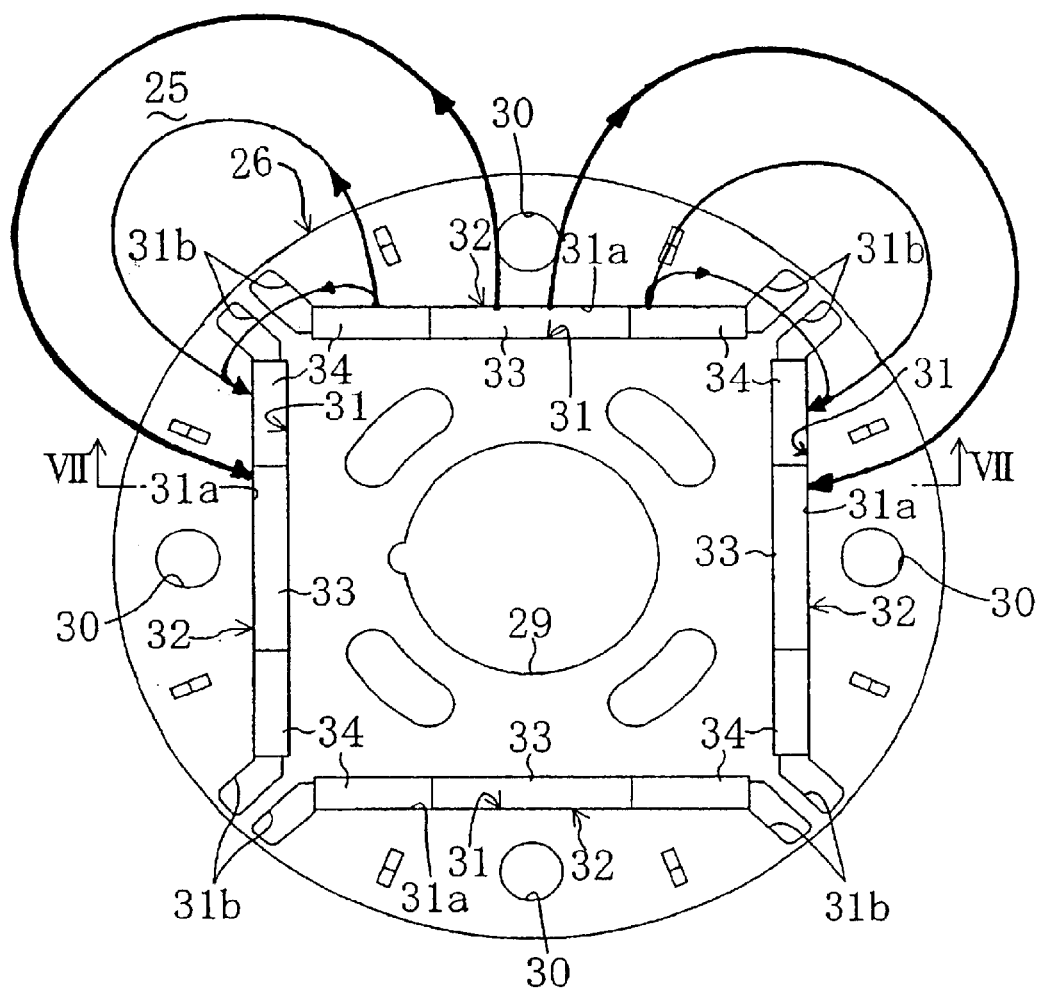
FIG. 6A is a view according to FIG. 6 illustrating the inherent flow of the rotor magnetic flux.
Figure 6B:
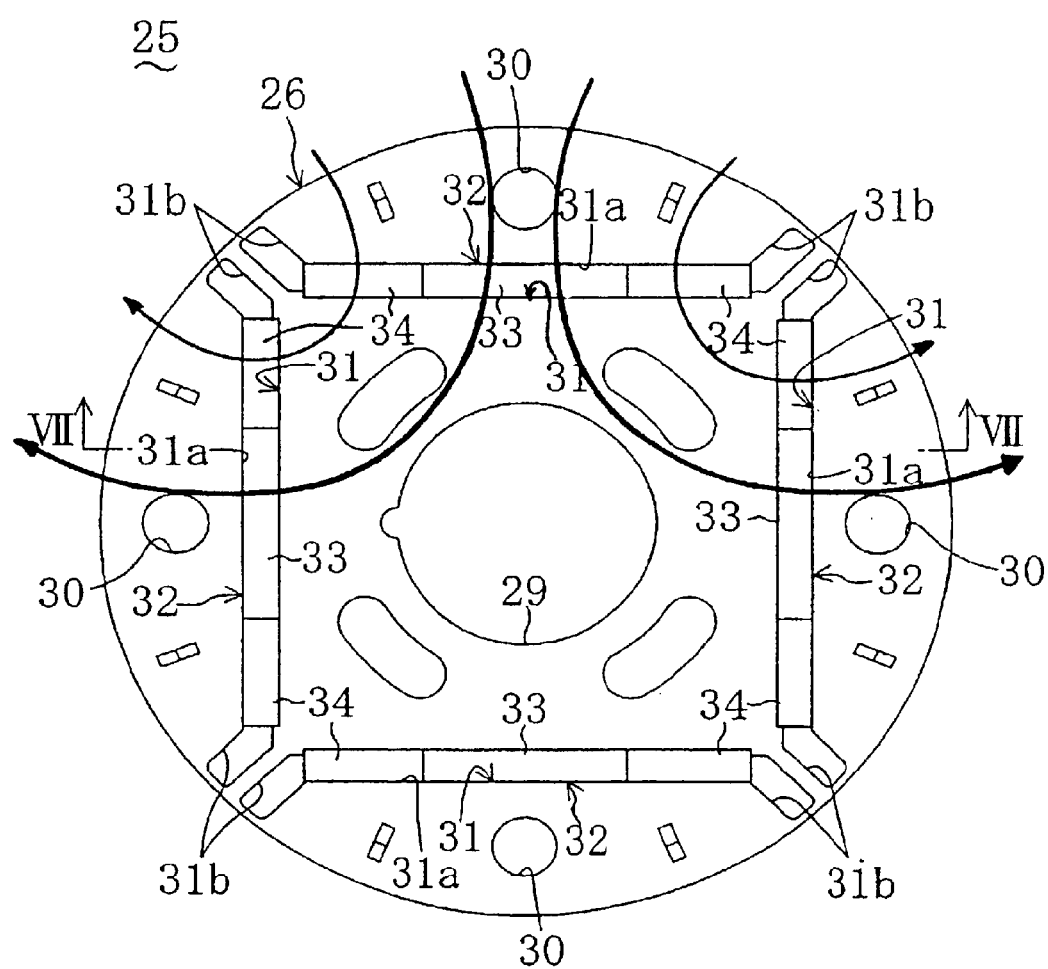
FIG. 6B is a view according to FIG. 6 illustrating the inherent flow of the stator magnetic flux.
Figure 7:
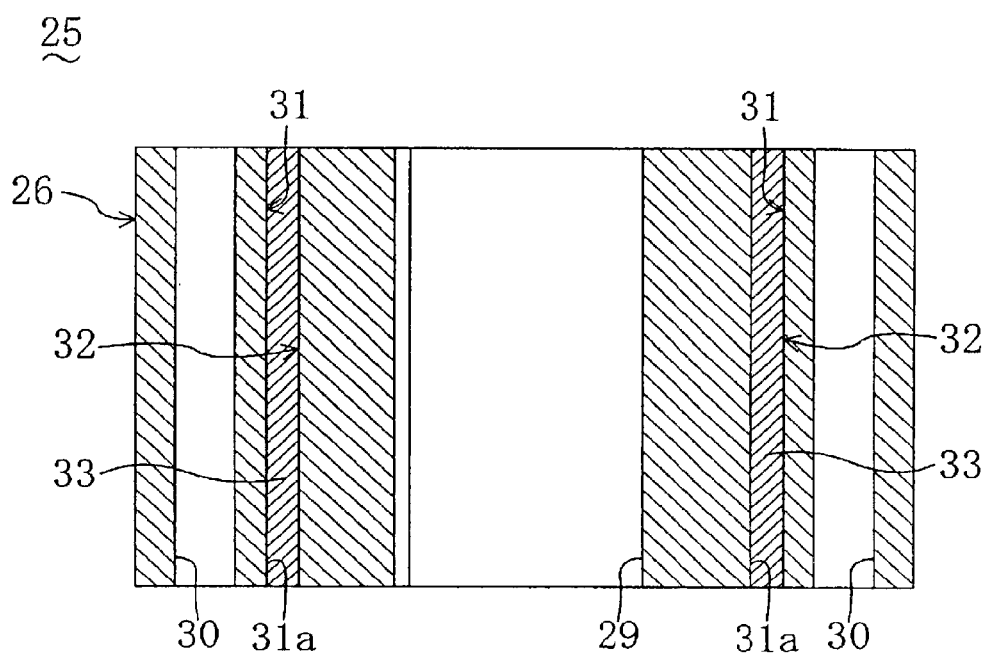
FIG. 7 is a sectional view taken on line VII—VII of FIG. 6.

FIGS. 6 and 7 show the third embodiment of the present invention. Differently from the first embodiment, the third embodiment is constituted such that the central magnet (33) has a greater force of retaining magnetic flux and the end magnets (34), (34) have greater magnetic flux density.

In the third embodiment, the position of the central insertion portion (31a) of each magnet insertion portion (31) at the yoke (26) of the rotor (25) of the electric motor (20), namely the position of the each magnet (32) therein is placed close to the outer peripheral surface of the yoke (26).

Each of the magnet (32), similarly to the first embodiment, is divided into three parts, the central magnet (33) that is positioned at the central portion in the width direction of the central insertion portion (31a) of the magnet insertion portion (31) and end magnets (34), (34) that are positioned at end portions of the central insertion portion (31a). However, differently from the first embodiment, the both magnets (33), (34) have different characteristics in such manner that the central magnet (33) has a greater intrinsic coercive force than the end magnets (34), (34), whereas the end magnets (34), (34) have greater magnetic flux density than the central magnet (33).

That is, in the rotor (25), in which each magnet (32) is close to the outer peripheral surface of the yoke (26) like the third embodiment, contrary to the first embodiment, the central portion in the width direction of the magnet (32) becomes easier to be demagnetized than the end portion thereof due to the reverse magnetic field (stator magnetic flux) caused by currents of the coils (23) of the stator (21). Accordingly, the demagnetization of the magnet (32) can be prevented as a whole by the central magnet (3), which is positioned at the central portion in the width direction of the central insertion portion (31a), having greater intrinsic coercive force than the end magnets (34), (34), which are positioned at the end portions. Also, the end magnets (34), (34) that are difficult to be demagnetized have greater magnetic flux density than the central magnet (33), and thereby the max torque and the efficiency of the electric motor (20) can be improved by the magnetic flux density of the end magnets (34), (34). Accordingly, the present embodiment can also provide the similar function and effects to the first embodiment.

Herein, in the third embodiment, the magnet (32) may consist of one plate magnet like the second embodiment. That is, magnetic flux density and intrinsic coercive force of the one-plate magnet (32) are different along the peripheral direction of the yoke (26) (the width direction of the magnet (32)), and the magnet (32), as shown in FIG. 5, has changing characteristics in such manner that the magnet end portions (32b), (32b) that is difficult to be demagnetized have greater magnetic flux density than the magnet central portion (32a) that is easy to be demagnetized, whereas the magnet central portion (32a) easy to be demagnetized has a greater intrinsic coercive force than the magnet end portions (32b), (32b) difficult to be demagnetized.

In this case, the same function and effects as the above-described third embodiment can be provided.

Embodiment 4

Figure 8:
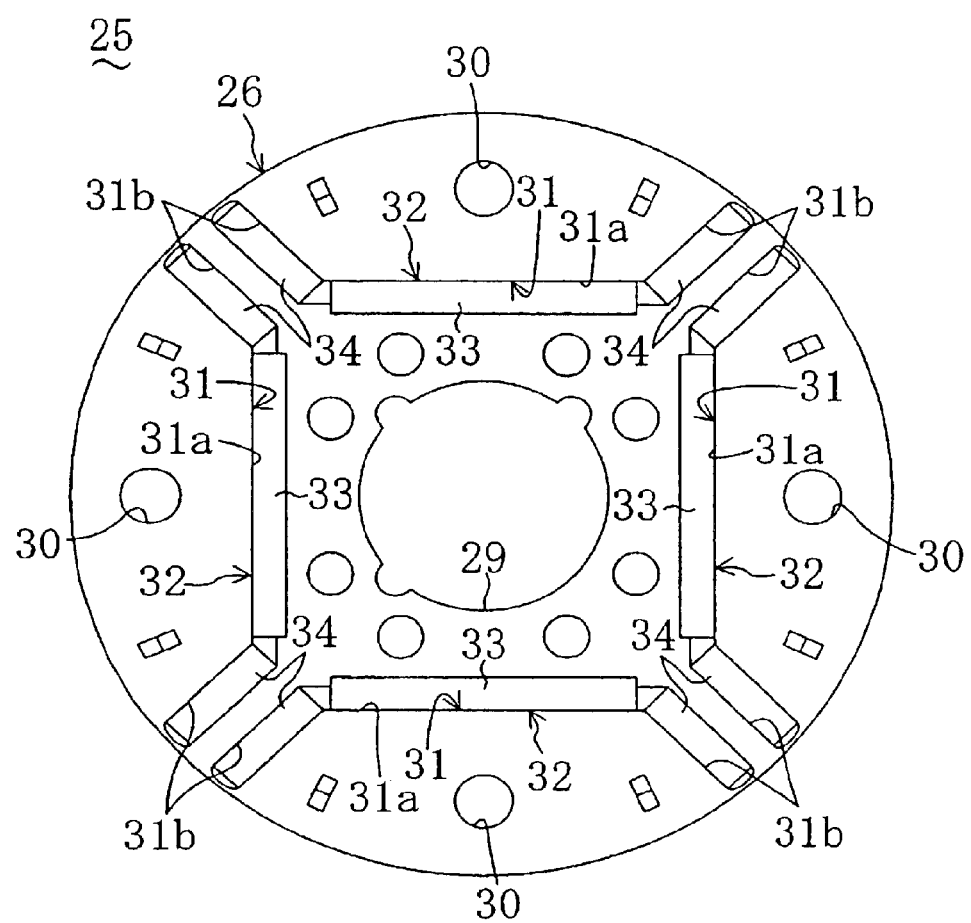
FIG. 8 is a view equivalent to FIG. 1 according to the fourth embodiment of the present invention.

FIG. 8 shows the fourth embodiment. In this embodiment, the central magnet (33) is inserted in and fixed to substantially the whole space of the central insertion portion (31a) of each magnet insertion portion (31), while the end magnets (34), (34) are inserted in and fixed to substantially the whole space of the both magnetic flux barrier portions (31b), (31b), which are constituted of air gaps (space) in the embodiments described above. This magnetic flux barrier (31b) is positioned where it is easy to be demagnetized by the reverse magnetic field caused by the stator current, and the two end magnets (34), (34) easy to be demagnetized have greater intrinsic coercive forces than the central magnet (33) difficult to be demagnetized, whereas the central magnet (33) difficult to be demagnetized has a greater magnetic flux density than the end magnets (34), (34) easy to be demagnetized. Other basic structures of the present embodiment are the same as the first embodiment.

The advantage of this structure of the fourth embodiment, in which the central magnet (33) is inserted in and fixed to substantially the whole space of the central insertion portion (31a) of each magnet insertion portion (31) and the end magnets (34), (34) are inserted in and fixed to the both magnetic flux barrier portions (31b), (31b) respectively, will be described. In general, the motor torque of the electric motor (20) is provided by combining magnetic torque, which is a reaction force caused by the magnetic flux of the magnet (32) of the rotor (25) and the stator magnetic flux of the coils (23) of the stator (21), and reluctance torque, which is a theory that can be applied to the above-described embodiments as well.

The reluctance torque is a force for rotating the rotor (25) from a certain position to a particular position where the stator magnetic flux can flow the most easily, in which a degree how easily the stator magnetic flux flow through the rotor (25) changes depending upon its relative position to the rotor (25), in the event that the yoke (26) of the rotor (25) has saliency. The larger the difference of the ease of this magnetic flux flowing at the both end positions is, the greater the reluctance torque is. Herein, assuming the case where no magnet is inserted in the rotor yoke (26), for example, in the event (A) that the magnet insertion portion (31) is provided at the yoke (26), there happens no difference of the ease of the stator magnetic flux flowing despite a position change of the rotor (25), resulting in no existence of the reluctance torque. Further, in the event (B) that the magnet insertion portion (31) is constituted of only the central insertion portion (31a) (no magnetic flux barrier portion), there happens some differences of the ease of the stator magnetic flux flowing depending upon a position change of the rotor (25), resulting in an existence of the reluctance torque for rotating the rotor (25) toward the position where the magnetic flux is easy to flow. Also, in the event (C) that the magnet insertion portion (31) includes the central insertion portion (31a) and a pair of the magnetic flux barrier portion (31b), (31b) extending subsequently from the central insertion portion (31a) (as shown in FIGS. 1, 6 and 8), there happens big differences of the ease of the stator magnetic flux flowing depending upon a position change of the rotor (25), resulting in an existence of the greater reluctance torque for rotating the rotor (25) toward the position where the magnetic flux is easy to flow than that in the above-described event (B). This is the reason for providing the magnetic flux barrier portion (31b).

Herein, if the relative permeability of the air, which represents the degree of the ease of making magnetic flux flow, is equivalent to 1.00, that of the core (yoke) is about 1000, while that of the magnet is about 1.05. Thus, the magnet has the same level of the relative permeability as the air, compared to the core, and thereby it has characteristics that it is difficult for the magnetic flux to flow. Accordingly, for the stator magnetic flux caused by the stator current, the magnet insertion portion (31) can be regarded as air gaps (air), whether it is the central insertion portion (31a) or the magnetic barrier portion (31b). Thus, the magnitude of the above-described reluctance torque is not influenced by the existence of the magnet in the magnet insertion portion (31) (the central insertion portion (31a) and the magnetic barrier portion (31b)).

The position of the rotor where the motor torque obtained by combining such reluctance torque and the magnet torque becomes a peak changes, and accordingly it is controlled according to the operating condition so that the motor torque can become as much as possible.

When comparing the structure that the central magnet (33) is inserted in the central insertion portion (31a) of the magnet insertion portion (31) and the end magnets (34), (34) are inserted in each magnetic flux barrier portion (31b) respectively like the fourth embodiment, and the structure that the magnet (33), (34) are inserted in only the central insertion portion (31a) of the magnet insertion portion (31) like the first embodiment (FIG. 1), the magnetic flux of the magnet of the structure in the forth embodiment is greater than that of the structure in the first embodiment, and thereby its magnetic torque described above becomes grater as well. Accordingly, the forth embodiment has an effect that the motor torque thereof is greater than that of the first embodiment and the like.

Herein, in the forth embodiment, like the second embodiment, one plate-shape magnet (32) having the cross section equivalent to the shape of the magnet insertion portion (31) may be inserted in the central insertion portion (31a) and the magnetic barrier portions (31b), (31b) of the magnetic insertion portion (31), in which its magnetic flux density and intrinsic coercive force are different along the peripheral direction of the yoke (26) (the width direction of the magnet (32)), and the magnet (32) has changing characteristics in such manner that the magnet central portion (32a) inserted in the central insertion portion (31a) that is positioned where it is difficult to be demagnetized has a greater magnetic flux density than the magnet end portions (32b), (32b) inserted in the magnetic flux barrier portion (31b), (31b) that are positioned where it is easy to be demagnetized, whereas the magnet end portions (32b), (32b) easy to be demagnetized have greater intrinsic coercive forces than the magnet central portion (32a) difficult to be demagnetized.

Further, in the above-described embodiments, the magnet (32) is constituted such that it is divided into three parts, the central portion (33); (32a) and two end portions (34), (34); (32b), (32b). However, the magnet may be divided into two, or four or more, in which a portion that is positioned where it is easy to be demagnetized has a greater intrinsic coercive force than a portion that is positioned where it is difficult to be demagnetized, whereas the portion difficult to be demagnetized has a greater magnetic flux density than the portion easy to be demagnetized.

Further, in the above-described embodiments, it is constituted such that each magnet (32) is demagnetized by the reverse magnetic field caused by the stator current flowing through the stator coils (23). However, the present invention can be applied to the case where the demagnetization is achieved by heating, in which the magnitudes of their intrinsic coercive force and magnetic flux density should be different respectively depending upon portions that are easy or difficult to be demagnetized by heating.

Further, in the above-described embodiments, the present invention is applied to the electric motor (20) as a motor for the compressor (C). However, the present invention, off course, may be applied to any permanent magnet-type electric motors having other usages than the compressor.

INDUSTRIAL APPLICABILITY

The present invention can prevent demagnetization of magnets as a whole without any cost increase by decreasing the amount of materials used for each magnet inserted in the rotor of the motor of the permanent magnet-type electric motor and improve the max torque and the efficiency of the electric motor by suppressing deterioration of magnetic flux density. Accordingly, the present invention has very high industrial applicability.

What is claimed is:

1. A permanent magnet-type electric motor, comprising:
   a stator; and
   a rotor having a magnetic field and disposed in the stator such that a reverse magnetic field is generated by said stator, said rotor including a plurality of permanent magnets forming a magnetic poles are inserted in magnet insertions of a yoke such that the magnets form in line in a circumferential direction thereof,
   each of said magnets including at least first and second magnets that are divided in the circumferential direction of said yoke, said first magnets being positioned in locations of high demagnetization resulting from the reverse magnetic field of said stator relative to the, magnetic field of said rotor while said second magnets being positioned in locations of low demagnetization resulting from the reverse magnetic field of said stator relative to the magnetic field of said rotor, said first magnets having a greater force of retaining magnetism than said second magnets, and said second magnets having a greater magnetic flux density than said first magnets.

2. The permanent magnet-type electric motor of claim 1, wherein
   each of said magnet is divided into a central magnet that is positioned at the central portion in the width direction of said magnet insertion portion and end magnets that are positioned at end portions of said magnet insertion portion, and said central magnet has a greater coercive force than the end magnets, whereas said end magnets have greater magnetic flux density than the central magnet.

3. The permanent magnet-type electric motor of claim 1, wherein
   each of said magnet is divided into a central magnet that is positioned at the central portion in the width direction of said magnet insertion portion and end magnets that are positioned at end portions of said magnet insertion portion, and the central magnet has a greater magnetic flux density than the end magnets, whereas the end magnets have greater coercive forces than the central magnet.

4. The permanent magnet-type electric motor of claim 2 or 3, wherein
   said magnet insertion portion comprises a central insertion portion that is positioned at the central portion in the circumferential direction of the yoke and magnetic flux barrier portions that extend outwardly and subsequently in substantially the radial direction of the yoke from the both ends of the central insertion portion, and said central magnet and said end magnets are inserted only in said central insertion portion.

5. The permanent magnet-type electric motor of claim 3, wherein
   said magnet insertion portion comprises a central insertion portion that is positioned at the central portion in the circumferential direction of the yoke and magnetic flux barrier portions that extend outwardly and subsequently in substantially the radial direction of the yoke from the both ends of the central insertion portion, and said central magnet is inserted in said central insertion portion and said end magnets are inserted in said magnetic flux barrier portions, respectively.

6. A permanent magnet-type electric motor, comprising:
   a stator; and
   a rotor having a magnetic field and disposed in the stator such that a reverse magnetic field is generated by said stator, said rotor including a plurality of permanent magnets forming magnetic poles are inserted in magnet insertions of a yoke such that the magnets form in line in a circumferential direction thereof;
   each of said magnets including at least first and second magnet portions that have different magnetic flux and force of retaining magnetism thereof in the circumferential direction of said yoke, said first magnet portions being positioned in locations of high demagnetization resulting from the reverse magnetic field of said stator relative to the magnetic field of said rotor while said second magnet portions being positioned in locations of low demagnetization resulting from the reverse magnetic field of said stator relative to the magnetic field of said rotor, said first magnet portions having a greater force of retaining magnetism than said second magnet portions and said second magnet portions having a greater magnetic flux density than said first magnet portions.

7. The permanent magnet-type electric motor of claim 6, wherein
each of said magnet includes a magnet central portion that is positioned at the central portion in the width direction of said magnet insertion portion and magnet end portions that are positioned at end portions of said magnet insertion portion, respective magnetic flux and coercive force of which are different from each other, and said magnet central portion has a greater coercive force than the magnet end portions, whereas the magnet end portions have greater magnetic flux density than the magnet central portion.

8. The permanent magnet-type electric motor of claim 6, wherein
each of said magnet includes a magnet central portion that is positioned at the central portion in the width direction of said magnet insertion portion and magnet end portions that are positioned at end portions of said magnet insertion portion, respective magnetic flux and coercive force of which are different from each other, and said magnet central portion has a greater magnetic flux density than the magnet end portions, whereas the magnet end portions have greater coercive forces than the magnet central portion.

9. The permanent magnet-type electric motor of claim 7 or 8, wherein
said magnet insertion portion comprises a central insertion portion that is positioned at the central portion in the circumferential direction of the yoke and magnetic flux barrier portions that extend outwardly and subsequently in substantially the radial direction of the yoke from the both ends of the central insertion portion, and said magnet is inserted only in said central insertion portion.

10. The permanent magnet-type electric motor of claim 8, wherein
said magnet insertion portion comprises a central insertion portion that is positioned at the central portion in the circumferential direction of the yoke and magnetic flux barrier portions that extend outwardly and subsequently in substantially the radial direction of the yoke from the both ends of the central insertion portion, and said magnet is inserted in said magnet insertion portion in such manner that said magnet central portion is inserted in said central insertion portion and said magnet end portions are inserted in said magnetic flux barrier portions, respectively.

11. A compressor comprising a casing and a compressing mechanism, wherein
the permanent magnet-type electric motor of claim 1 or 6 is installed in said casing to be coupled to said compressing mechanism.

* * * * *

UNITED STATES PATENT AND TRADEMARK OFFICE
CERTIFICATE OF CORRECTION

PATENT NO. : 6,849,981 B2
DATED : February 1, 2005
INVENTOR(S) : Hiroaki Kojima et al.

It is certified that error appears in the above-identified patent and that said Letters Patent is hereby corrected as shown below:

Title page,
Item [54], Title, should read -- PERMANENT MAGNET-TYPE ELECTRIC MOTOR AND COMPRESSOR USING THE SAME --

Signed and Sealed this

Tenth Day of May, 2005

JON W. DUDAS
*Director of the United States Patent and Trademark Office*